United States Patent [19]
Barkhimer et al.

[11] Patent Number: 5,752,689
[45] Date of Patent: May 19, 1998

[54] SOLENOID VALVE ASSEMBLY WITH ARMATURE GUIDE AND FUEL INJECTION SYSTEM INCORPORATING SUCH A VALVE

[75] Inventors: Robert L. Barkhimer, Poway; Brian D. Barkhimer, Santee, both of Calif.

[73] Assignee: Servojet Products International, San Diego, Calif.

[21] Appl. No.: 756,238

[22] Filed: Nov. 26, 1996

[51] Int. Cl.[6] .................................................. F16K 31/06
[52] U.S. Cl. ........................ 251/129.15; 251/129.14; 235/262; 239/585.4
[58] Field of Search ................ 251/129.14, 129.15; 335/262; 239/585.1, 585.4, 585.5

[56] References Cited

U.S. PATENT DOCUMENTS

| | | |
|---|---|---|
| 2,651,744 | 9/1953 | Acklin et al. . |
| 3,432,140 | 3/1969 | Ray . |
| 3,510,814 | 5/1970 | Nordfors .................. 335/262 |
| 3,653,630 | 4/1972 | Ritsema . |
| 3,727,487 | 4/1973 | Forster et al. . |
| 3,791,408 | 2/1974 | Saitou et al. . |
| 3,851,285 | 11/1974 | Rothfuss et al. . |
| 4,233,585 | 11/1980 | Sugimoto et al. . |
| 4,250,922 | 2/1981 | Will et al. . |
| 4,278,959 | 7/1981 | Nishimiya et al. . |
| 4,628,881 | 12/1986 | Beck et al. .................. 123/447 |
| 4,656,448 | 4/1987 | Luezow .................. 335/262 |
| 4,919,390 | 4/1990 | Ichriyu et al. . |
| 4,997,004 | 3/1991 | Barkhimer . |
| 5,145,148 | 9/1992 | Laurent . |
| 5,192,048 | 3/1993 | Wakeman . |
| 5,207,410 | 5/1993 | Wakeman . |
| 5,261,637 | 11/1993 | Curnow . |
| 5,284,317 | 2/1994 | Brehm et al. . |

*Primary Examiner*—Kevin Lee
*Attorney, Agent, or Firm*—Nilles & Nilles, S.C.

[57] ABSTRACT

A solenoid valve assembly incorporates a guide which slidably engages and guides the armature of the assembly's solenoid at a location above the pole piece of the assembly. The guide preferably takes the form of a guide bushing that slidably engages a reduced-diameter end section of the armature. The guide bushing is fixedly disposed in the same tube that surrounds the armature of the solenoid and around which is disposed the solenoid's coil. The solenoid valve assembly exhibits dramatically improved durability when compared to prior art valve assemblies in which the armature was supported in the pole piece. Cycle-to-cycle and valve-to-valve injection uniformity also are enhanced. The solenoid valve assembly is particularly well suited for use in a gaseous fuel injection system for an internal combustion engine because the lack of lubricants in the gas causes rapid wear in valve assemblies having armatures guided in the pole piece.

18 Claims, 3 Drawing Sheets

SOLENOID VALVE ASSEMBLY WITH ARMATURE GUIDE AND FUEL INJECTION SYSTEM INCORPORATING SUCH A VALVE

BACKGROUND OF THE INVENTION

1. Field of the Invention

The invention relates to solenoid valve assemblies and, more particularly, to a solenoid valve assembly having its armature guided by a structure other than the pole piece of the solenoid and usable, for example, as an electronic fuel injector. The invention additionally relates to a fuel injection system employing as a gaseous fuel injector thereof a solenoid valve assembly having a guided armature.

2. Discussion of the Related Art

Solenoid-actuated valve assemblies, generally known as "solenoid valve assemblies", are widely used in a multitude of applications including fuel injection systems. The typical solenoid valve assembly of interest herein includes a housing assembly in which is disposed a solenoid and a valve assembly in axial alignment with one another. The solenoid assembly includes a coil, a stationary pole piece or stator, and a movable plunger including an armature and a drive pin. The plunger extends axially through a bore in the pole piece such that, upon energization or deenergization of the coil, the plunger moves axially to open and close a valve element of the valve assembly. A great many solenoid valve assembly designs are available, with the design details being tailored to meet the needs of a particular application.

Turning now to FIG. 1, a solenoid valve assembly 10 is illustrated that is usable, for example, in gaseous fuel injection systems. Assembly 10 includes a housing assembly 12 in which is disposed a solenoid 14 and a valve assembly 16. The valve assembly 16 includes a valve ball 18 which is spring biased onto a seat 20 to normally block an outlet port 22 of the valve assembly 16 from an inlet port 24 of the valve assembly 10. The solenoid 14 includes a coil 26 disposed outside a support tube 28 and a plunger 30 and a pole piece 32 disposed within the tube 28. The plunger 30 includes a rear armature 34 and a front drive pin 36 fixedly coupled to one another. Energization of the coil 26 causes the armature 34 to move downwardly or forwardly as seen in FIG. 1 so that the drive pin 36 lifts the valve ball 18 from its seat to permit fluid flow through the valve assembly 16. When the solenoid valve assembly 10 is used in a gaseous fuel injection system, the solenoid 14 will be energized once during each injection event, or as much as several thousand times per minute.

In order to reduce valve wear and to promote valve-to-valve, cycle-to-cycle, and long-term uniformity of fluid flow though the valve assembly 16, it is desirable that the plunger 30 remain coaxial both with the pole piece 32 and the valve ball 18. This coaxialarity is sought by guiding the drive pin 36 in a bushing 38 at its front end and in the pole piece 32 at its rear end. Specifically, the bushing 38 slidably engages the front end of the drive pin 36 at a location between the pole piece 32 and the valve ball 18. The axial bore in the pole piece 32 is stepped so as to present a rear guide 40 which slidably engages the rear end of the drive pin 36. This guidance would be sufficient if the loads imposed on and by the drive pin 36 were purely axial. However, it has been discovered that, due to eccentricity between the pole piece 32 and plunger 30 which often arises during manufacturing, the plunger 30 imposes both axial and radial loads on the pole piece 32. Additional radial loads are imposed on the plunger 30 and hence on the pole piece 32 due to eccentricity of the coil 26 with respect to the plunger 30. Imposition of radial loads on the relatively soft metal pole piece 32 leads to enlargement of guide 40. As a result, a clearance forms between the outer end of the drive pin 36 and the pole piece 32. The drive pin 36 then becomes axially misaligned from the pole piece 32 and the valve ball 18, leading to non-uniformities in cycle-to-cycle injection events which increase in magnitude with increased pole piece and valve wear. In addition, continued wear of the pole piece 32 results in damage to the pole piece 32 which in turn results in the generation of nonuniform magnetic fields and degraded valve operation. Moreover, because the drive pin 36 typically is ground or otherwise is not entirely smooth, it may act as a miniature broach and worsen the potential problem of damaging the pole piece 32 upon the imposition of radial loads. All of these problems are exasperated by the fact that the axial spacing between the pole piece guide 40 and the valve guide bushing 38 is relatively small so that the stress imposed on guide 40 are relatively high.

The problems of pole piece wear and damage are especially evident in applications in which the valve assembly must be operated repeatedly and at high frequency to supply a gas or other fluid having little if any lubricant therein. For example, in liquified natural gas (LNG) fuel injection systems in which the solenoid valve assembly serves as a fuel injector, the solenoid valve assembly will be operated as often as several thousand times per minute to inject LNG into a cylinder of an internal combustion engine. Unlike compressed natural gas (CNG) which entrains some lubricants from the compressor pump, LNG is essentially pure gas and has few if any lubricants therein. Sliding contact between the drive pin and pole piece guide therefore occurs under relatively high-friction conditions, leading to relatively rapid pole piece wear and the resulting detrimental effects detailed above.

Several solenoid valve assemblies have been proposed which provide some mechanism to guide a plunger at a location above the pole piece. Such solenoid valve assemblies are disclosed, for example, in U.S. Pat. No. 3,791,408 to Saitou; U.S. Pat. No. 4,250,922 to Will; U.S. Pat. No. 4,233,585 to Sugimoto; U.S. Pat. No. 4,278,959 to Nishimiya; and U.S. Pat. No. 4,919,390 to Ichiru. However, none of these solenoid valve assemblies are described as being for use in gaseous fuel injection systems in which wear on a pole piece is especially problematic. Moreover, and perhaps more importantly, all employ somewhat complicated guide structures which cannot be easily incorporated into existing solenoid valve assembly designs. None is adapted to fit into the existing support tube of a solenoid valve assembly and to require no further modifications to the assembly apart from a slightly modified armature. Moreover, most of these assemblies guide an element of essentially the same diameter as the drive pin as opposed to the wider armature and therefore subject relatively high radial stress on both the guide element and the guided element.

OBJECTS AND SUMMARY OF THE INVENTION

It is therefore an object of the invention to provide a solenoid valve assembly that exhibits increased durability and enhanced uniformity of fluid flow when compared to similar prior solenoid valve assemblies.

Another object of the invention is to provide a solenoid valve assembly that meets the first object of the invention and that requires minimal modifications to existing solenoid valve assembly designs.

In accordance with a first aspect of the invention, these objects are achieved by providing a solenoid valve assembly comprising a valve housing having front and rear opposed axial ends, a valve element which is disposed in the valve housing in the vicinity of the front end thereof, and a tube of essentially constant diameter which is disposed in the valve housing and which extends axially from the rear end of the valve housing towards the front end. A coil surrounds the tube, and a stationary pole piece is disposed within the tube and has a bore formed axially through a central portion thereof. A plunger is provided and includes (1) a drive pin which extends through the bore in the pole piece with a radial clearance formed between the drive pin and the wall of the bore, the drive pin having a rear end disposed within the tube and having a front end located axially between the pole piece and the valve element, and (2) an armature which is positioned within the tube between the rear end of the tube and the drive pin and which is coupled to the drive pin. A guide is positioned within the tube between the rear end of the tube and the pole piece. The guide (1) fixedly engages the tube, (2) surrounds and is slidably engaged by at least a portion of the armature, and (3) guides the armature for axial motion within the tube upon energization of the coil.

Preferably, in order to permit the solenoid valve assembly to accommodate the guide without having to machine a recess into the tube or otherwise change the design of the tube, the armature is stepped and has a rear end portion of reduced diameter which is surrounded and guided by the guide and a front end portion of enlarged diameter which is located between the guide and the pole piece. A radial clearance is formed between the front end portion and the tube.

The guide preferably comprises a metal or composite bushing, possibly impregnated with a lubricant.

Preferably, a second guide is mounted in the housing axially between the pole piece and the front end of the drive pin. The second guide (1) fixedly engages the housing, (2) surrounds and is slidably engaged by the drive pin, and (3) guides the drive pin for axial motion within the tube upon energization of the coil.

Still another object of the invention is to provide a gaseous fuel injection system that is adapted to inject a gaseous fuel into a cylinder of an internal combustion engine and that exhibits improved durability and uniformity of injection through the use of an electronic fuel injector having a guided armature.

In accordance with another aspect of the invention, this object is achieved by providing a gaseous fuel injection system that includes a source of the gaseous fuel, and a solenoid valve assembly. The solenoid valve assembly is supported on the engine and has a gaseous fuel inlet connected to the source and a gaseous fuel outlet in fluid communication with the cylinder. The solenoid valve assembly is constructed as described above in accordance with the first aspect of the invention.

Preferably, a gas manifold is mounted on the engine and receives the solenoid valve assembly as well as a second solenoid valve assembly of identical construction.

Preferably, the source comprises a storage tank containing liquified natural gas.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

1. Resume

Pursuant to the invention, a solenoid valve assembly is provided which incorporates a guide which slidably engages and guides the armature of the assembly's solenoid at a location above the pole piece of the assembly. The guide preferably takes the form of a guide bushing that slidably engages a reduced-diameter end section of the armature. The guide bushing is fixedly disposed in the same tube which surrounds the armature of the solenoid and around which is disposed the solenoid's coil. The solenoid valve assembly exhibits dramatically improved durability when compared to prior art valve assemblies in which the armature was supported in the pole piece. Cycle-to-cycle and valve-to-valve injection uniformity also are enhanced. The solenoid valve assembly is particularly well suited for use in a gaseous fuel injection system for an internal combustion engine because the lack of lubricants in the gas causes rapid wear in valve assemblies having armatures guided in the pole piece.

2. Construction of Solenoid Valve Assembly With Guided Armature

Figure 1:
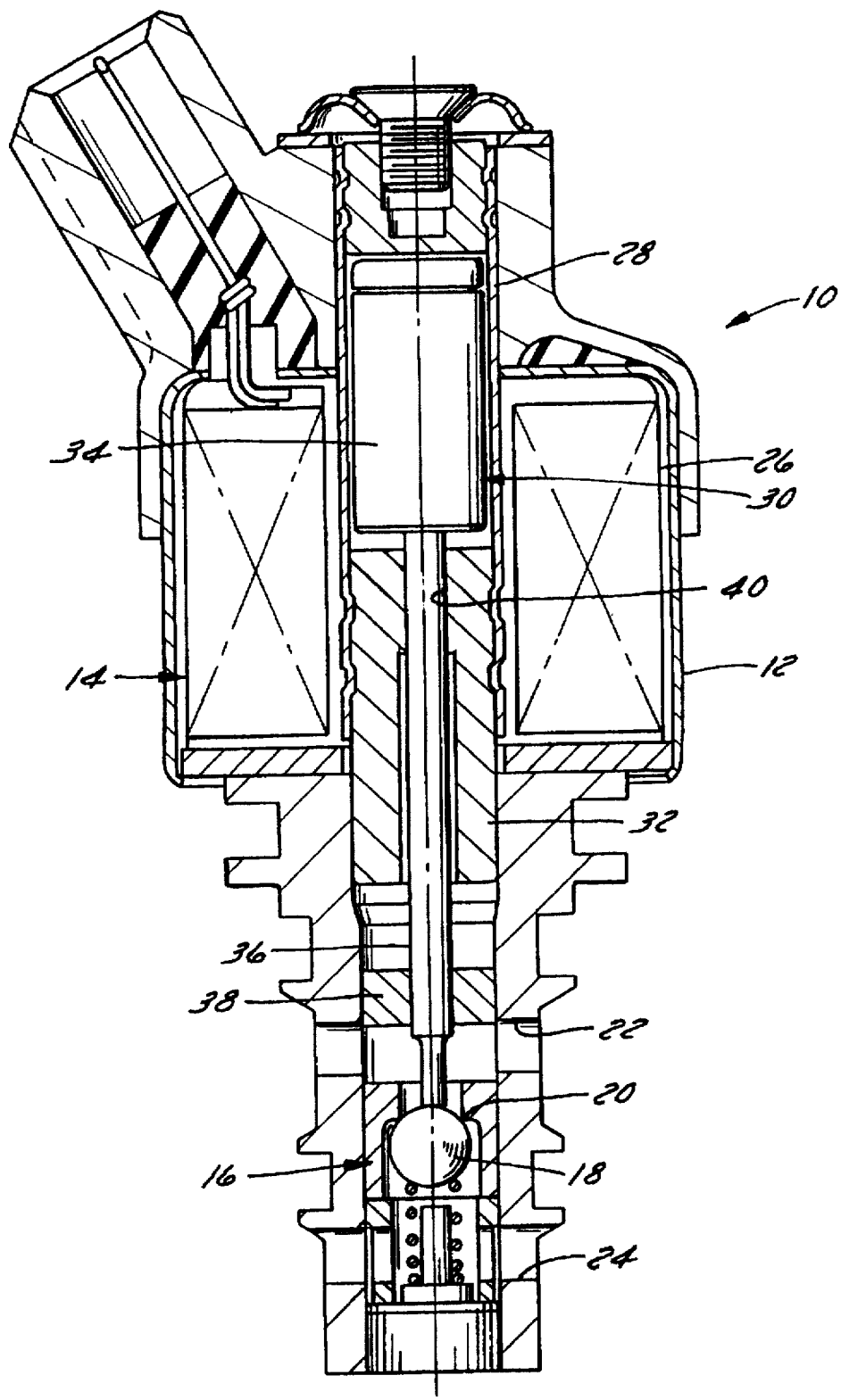
FIG. 1 is a sectional side elevation view of a prior art solenoid valve assembly, appropriately labeled "PRIOR ART"
Figure 2:
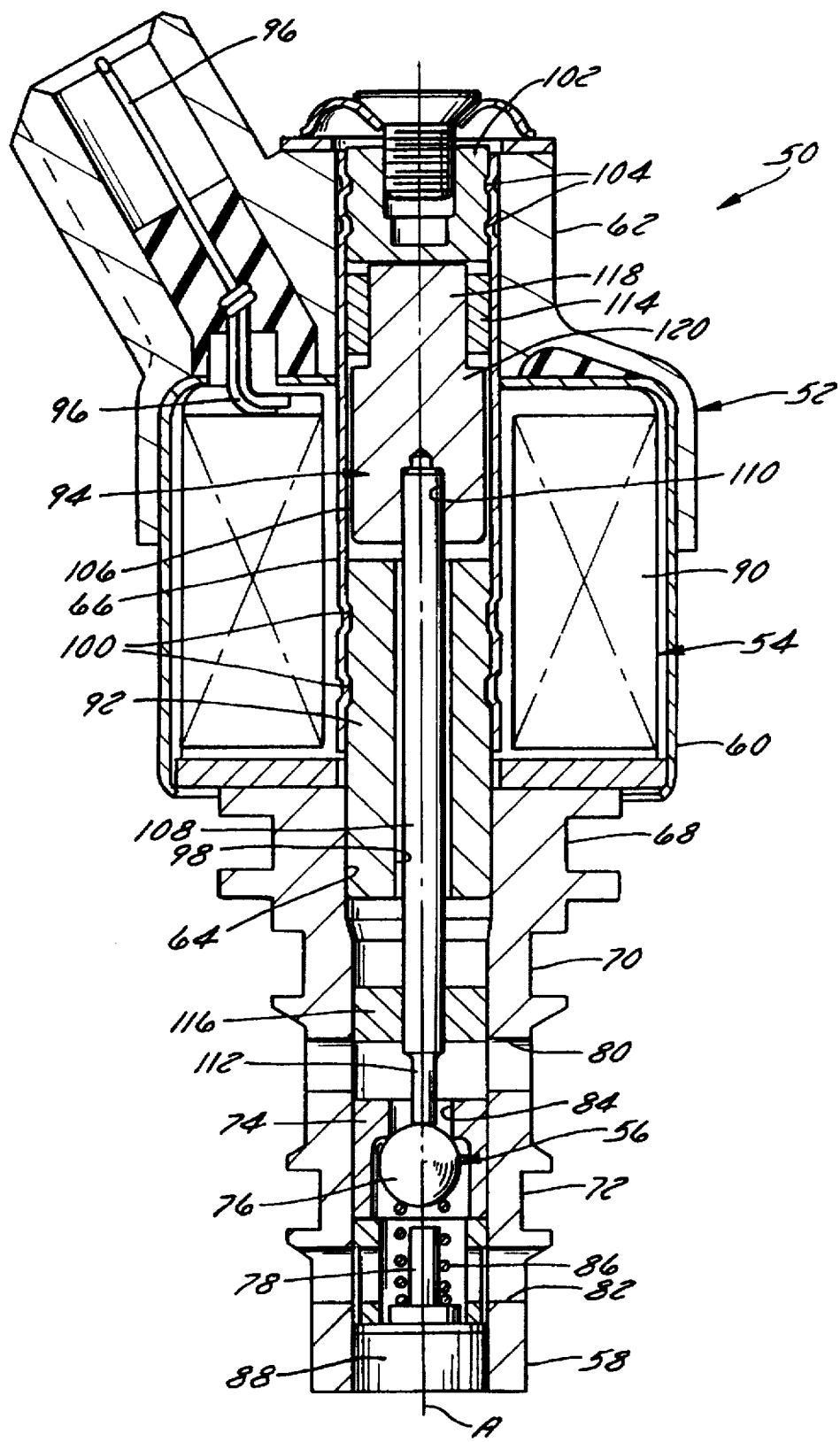
FIG. 2 is a sectional side elevation view of a solenoid valve assembly constructed in accordance with a preferred embodiment of the invention.

Referring now to FIG. 2, a solenoid valve assembly 50 is illustrated that is constructed in accordance with the present invention. The solenoid valve assembly 50 includes a cylindrical housing assembly 52 in which is disposed a solenoid 54 and a valve assembly 56 located axially in front of the solenoid (the terms "in front of", "behind" and the like as used herein are merely conventions and are not intended to require any particular direction of extension). The illustrated housing assembly 52 is formed in three sections including a front valve housing 58, an intermediate solenoid housing 60, and a rear end cap 62 all fixedly interconnected. A bore 64 extends axially through the entire housing assembly 52. A solenoid support tube 66 extends from the rear end of the cap 62 to the front end of the solenoid housing 60. The valve housing 58 of the illustrated embodiment is configured for mounting in a gas manifold and, for this purpose, has rear, intermediate, and front grooves 68, 70, and 72. Groove 68 cooperates with a clamp plate (not shown) that clamps the solenoid valve assembly 50 to the gas manifold 164 detailed in Section 4 below. Grooves 70 and 72 receive O rings (not shown) for sealingly mounting the solenoid valve assembly 50 in a corresponding bore of a gas manifold 164.

The configuration of the valve assembly 56 may vary significantly depending upon the purpose of the solenoid valve assembly 50. The illustrated solenoid valve assembly 50 comprises a two-way/two-position valve assembly usable as a gaseous fuel injector. The valve assembly 56 includes a seat 74, a valve element 76, and a stop 78, all of which are disposed between an inlet port 82 formed radially through the valve housing 58 and an outlet port 80 formed radially through the valve housing 58 axially in front of the inlet port 82. The seat 74 is formed from a metallic element taking the form of an inverted U and fixedly mounted in the bore 64 between the inlet port 82 and the outlet port 80 (the radial leg of the seat 74 is preferably formed from a separate spacer which permits control of valve travel). A hole 84 is formed axially through the radial leg of the seat 74 to permit passage of the armature drive pin 108 (detailed below) and fluid. The valve element 76 includes a ball which has a diameter greater than the diameter of the hole 84. In the deenergized state of the solenoid 54, the valve element or valve ball 76 is biased into engagement with the seat 74 by a return spring 86 to block the hole 84. The stop 78, which functions to limit movement of the valve ball 76 away from the valve seat 74 and to serve as a cylindrical guide for the spring 86, takes the form of a rearwardly-extending axial pin mounted on a plug 88 fixedly engaging the front end of the valve housing 58.

The solenoid 54 is designed to be relatively simple to fabricate and to assemble and yet to provide a high degree of stability, uniformity, and durability. The solenoid 54 includes the cylindrical support tube 66, a coil 90, a pole piece 92, and a plunger 94. The tube 66, which is constructed of a non-magnetic material such as stainless steel or an aluminum alloy, forms the body or base of the solenoid 54. The tube 66 is of essentially constant diameter and extends axially from the rear end of the housing assembly 52 towards the front end. In the illustrated embodiment, the tube 66 stops just short of the rear end of the valve housing 58.

The coil 90 coaxially surrounds the tube 66 and is encased by the solenoid housing 60. Electrical supply conductors 96 extend through a suitable opening in the housing assembly 52 and into electrical connection with the coil 90.

The pole piece 92 comprises an elongated, cylindrical body of magnetic material that is mounted in the forward portion of the tube 66 in magnetic registry with the forward portion of the coil 90 so as to extend forwardly from both the tube 66 and the coil 90. The pole piece 92 has a central axial bore or passage 98 extending therethrough of essentially constant diameter. A pair of sharpened external annular grooves 100 are formed in the rear portion of the pole piece 92 to enable the pole piece 92 to be fixed and sealed to the tube 66 by annular swaging of the tube 66 into the grooves 100. The front portion of the pole piece 92 extends forwardly into and is axially secured in a counterbored portion of the housing bore 64. An end plug 102 of non-magnetic material is locked and sealed in the rear end of the tube 66 by annular swaging of the wall of the tube 66 into a pair of sharp-edged external annular grooves 104 on the end plug 102. The front end surface of the end plug 102 is imperforate to permit it to act as a stop for the plunger 94.

The plunger 94 includes a rear armature 106 of magnetic material and a front drive pin 108. Drive pin 108 is fixedly attached to the front end of the armature 106, e.g., by being press fitted into an axial hole 110 formed in the armature 106. The drive pin 108 extends forwardly from the armature 106, through the axial bore or passage 98 in the pole piece 92, and to a front end 112 terminating axially between the pole piece 92 and the valve ball 76 so as to be capable of engaging the valve ball 76 and of driving the valve ball 76 away from the seat 74. The diameter of the drive pin 108 is smaller than the diameter of the bore 98 in the pole piece so that an annular clearance is formed therebetween. This annular clearance is of uniform thickness and extends the entire axial length of the pole piece 82. The front end 112 of the drive pin 108 is of a reduced diameter to provide radial clearance between the drive pin 108 and the edge of the hole 84 in the valve seat 74 of sufficient diameter to permit free fluid flow through the hole 84 when the valve assembly 56 is open.

The plunger 94 is slidably guided at its front and rear ends so as to assure that the plunger 94 remains coaxial with the valve assembly 56 and the pole piece 92, i.e., that all three elements retain the same axis A in FIG. 2. Guidance is achieved by the provision of two separate guides, the first or armature guide 114 of which is located above or behind the pole piece 92, the second or drive pin guide 116 of which is located beneath or in front of the pole piece 92, and both of which slidably engage the plunger 94.

The first or armature guide 114 surrounds and is slidably engaged by the armature 106. This guide 114 preferably takes the form of a bushing that is fixedly mounted in the tube 66 near the rear end of the tube so as not to require any modification to the design of the tube 66 or the plug 102. The guide bushing 114 is formed from a relatively durable non-magnetic material, preferably brass or plastic, and may if desired be impregnated with a lubricant. The guide bushing 114 surrounds the rear end portion of the armature 106, with the armature 106 being stepped such that the rear end portion 118 is of a reduced diameter as compared to the front end portion 120 to accommodate the guide bushing 114 without having to machine a recess into the side of the tube 66 to accommodate insertion of the guide bushing 114. The guide bushing 114 is relatively long and wide so as to distribute loads over a relatively large area and hence to minimize stress on the guide bushing 114 and the armature 106. The forward or larger diameter end portion 120 of the armature 106 is nearly as wide as the ID of the tube 66 but does not contact the wall of the tube 66. Hence, while the plunger 94 is slidably guided by contact between the rear end 118 of the armature 106 and the inner surface of the guide bushing 114, it does not contact either the tube 66 or the pole piece 92.

The second or drive pin guide 116 also preferably takes the form of a bushing or guide ring which also is preferably made of brass or another suitable non-magnetic metal. The guide bushing 116 is fixedly mounted in the valve housing 58 beneath the counterbore at a location just above the outlet port 80 so as to surround the drive pin 108 and to be slidably engaged by the drive pin.

Several advantages result from the illustrated arrangement of guide bushings or guide rings 114 and 116. First, because they are spaced axially as far as practical from one another, the radial loads imposed on them by the plunger 94 is minimized. Guidance provided by the first or armature guide bushing 114 is enhanced by virtue of the fact that it slidably engages the relatively large diameter plunger 106 as opposed to the relatively small diameter drive pin 108. Moreover, no difficult-to-machine recess need be formed in either the tube 66 which receives the guide bushing 114 or in the valve housing 58 which receives the guide bushing 116. Nor are any modifications required to the plug 102 or the pole piece 92 (apart from the advantageous elimination of the counterboring operation which would otherwise be required to form a guide in the pole piece). Hence, the only significant complicating fabricating step comes from the formation of a step in the armature 106—a relatively easy task when compared to the counterboring operations that would otherwise be required to provide guidance via the pole piece 92 or even the plug 102. Other operational benefits of this guide arrangement will become apparent from the following Section.

3. Operation of Solenoid Valve Assembly

The operation of the solenoid valve assembly 50 should be for the most part self-evident from the foregoing and hence will be described only briefly. When the coil 90 is deenergized, the valve assembly 56 assumes a closed state in which the valve ball 76 is driven onto the seat 74 under the action of the return spring 86 and the armature 106 is driven rearwardly to or near its rearward-most position in which it contacts the plug 102. Energization of the coil 90 causes the plunger 94 to move forwardly or downwardly as illustrated in FIG. 2 to drive the valve ball 76 away from the seat 74 and into contact with the stop 78, thereby opening the valve. A small axial gap still remains between the armature 106 and the pole piece 92 at the end of this motion so that the pole piece 92 is not damaged. Coaxialarity between the plunger 94, the valve assembly 56, and the pole piece 92 is assured by sliding engagement between the armature 106 and the first or armature guide bushing 114 and between the drive pin 108 and the second or drive pin guide bushing 116.

Experiments have shown that several operational benefits result from the interaction of the first and second guide bushings 114 and 116. By maintaining coaxialarity between the armature 94, the pole piece 92, and the valve ball 76, the guide bushings 114 and 116 not only assure the desired optimal interaction between the tip of the drive pin 108 and the valve ball 76, but also assure that a uniform air gap between the drive pin 108 and the pole piece 92 is retained, thereby assuring a uniform thrust on the armature 106 by the coil 90. This improved guidance and improved uniformity of thrust assure reduced valve-to-valve and cycle-to-cycle flow variations across the valve assembly 56. Moreover, because degraded guidance which would otherwise occur upon pole piece wear is avoided, this enhanced cycle-to-cycle flow uniformity still remains after many operational cycles. The improved guidance provided by the first guide bushing 114 also produces reduced opening and closing variability during valve operation, thereby further enhancing operational consistency. Also, valve bounce, i.e., movement of the drive pin 108 and the valve ball 76 forwardly upon valve closure, is reduced due to drive pin damping caused by sliding contact between the armature 106 and the guide bushing 114, thereby increasing operational predictability and reducing valve wear. Valve wear is reduced further by the absence of contact between the plunger 94 and the pole piece 92. The aggregate effect is improved operational predictability with a dramatically increased valve life. Tests have revealed that the solenoid valve assembly 50 continues to operate optimally without noticeable deterioration of flow uniformity after more than 500 million cycles of operation—long after solenoid valve assemblies having a traditional pole piece guide as opposed to the armature guide would be expected to degrade performance under the same operating conditions.

The benefits of the first or armature guide 114 are especially noticeable when the solenoid valve assembly 50 is used for the passage of dry media such as that resulting from liquified natural gas. In such applications, the inherent lubricating effect of liquid flowing through the solenoid valve assembly 50, which might otherwise ameliorate the detrimental effects of contact between the plunger and the pole piece, are absent. A system that employs a solenoid valve assembly of this type and that is improved by it will now be detailed.

4. Construction and Operation of Gaseous Fuel Injection System

Figure 3:
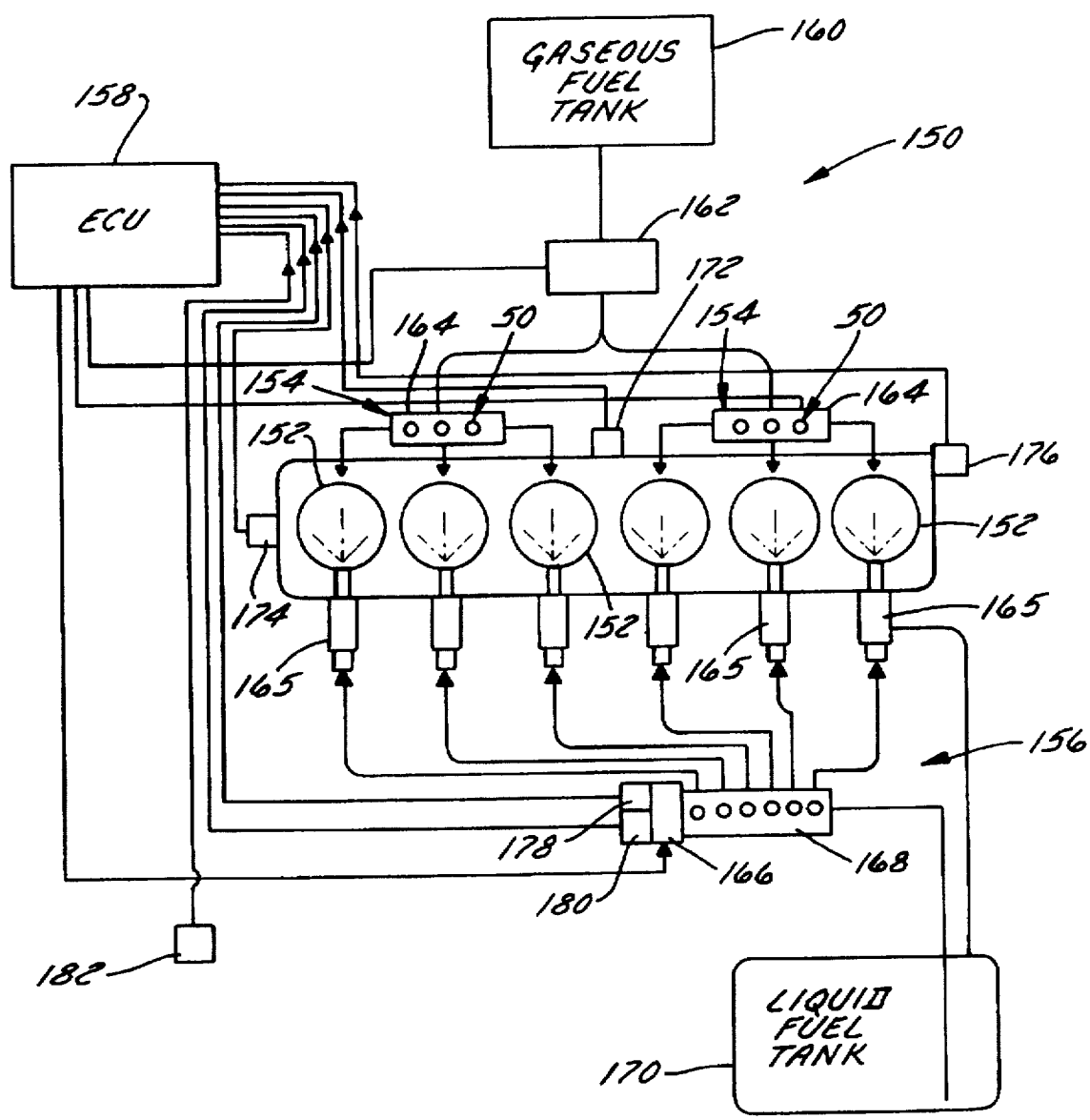
FIG. 3 schematically represents an internal combustion engine employing a gaseous fuel injection system using solenoid valve assemblies of FIG. 2 as gaseous fuel injectors thereof.

Turning now to FIG. 3, an internal combustion engine 150 is illustrated which includes as some its injectors solenoid valve assemblies 50 as described in Sections 2 and 3 above. The illustrated engine 150 is a compression ignition-type, dual-fuel internal combustion engine having a plurality (six in the illustrated embodiment) of cylinders 152. Fuel is supplied to each of the cylinders both by a primary, gaseous fuel injection system 154 and by a pilot, liquid fuel injection system 156. Operation of both systems 154 and 156 is controlled electronically by an electronic control unit (ECU) 158.

The gaseous fuel injection system 154 could accommodate compressed natural gas (CNG), liquified natural gas (LNG) or even other gaseous fuels. However, as discussed above, the benefits of the solenoid valve assembly 50 and thus the improvements in gaseous fuel injection are most noticeable in LNG fueled engines. The illustrated fuel injection system therefore includes a LNG injection system which includes a storage tank 160, an electronically controlled three-way gas shut-off valve 162, and two gas manifolds 164, each of which receives three solenoid valve assemblies 50 of the type described in Sections 2 and 3 above. Other common components of LNG fueled engines, such as a heat exchanger and a liquid/vapor pressure control system, form no part of the invention and are omitted from this disclosure for the sake of conciseness.

Each of the gas manifolds 164 has three bores formed therein with a separate solenoid assembly 50 mounted in each bore and sealed in place using the O-rings described in Section 2 above. Each manifold 164 has a common supply rail extending through the inlet ports 82 of all three solenoid valve assemblies 50. Each solenoid valve assembly 50 selectively supplies a charge of natural gas to the air intake port (not shown) of the associated cylinder 152 upon solenoid energization after the gas is withdrawn from the LNG storage tank 160 and converted to its gaseous in a conventional manner.

The pilot fuel injection system 156 is required for pilot ignition of the gaseous fuel because the illustrated engine 150 is compression ignited rather than spark ignited. The illustrated pilot fuel injection system 156 includes six pilot fuel injectors 164, each of which is arranged to inject a liquid fuel such as diesel fuel into one of the engines cylinders 152. The injectors 164 receive fuel from a common pump 166 which is controlled by a rack 168 that in turn receives fuel from a storage tank 170.

The shut-off valve 162, solenoid valve assemblies 50, and rack 168 are all controlled electronically by operation of the ECU 158 based upon the outputs of signals from sensors 172, 174, 176, 178 and 180 monitoring intake air temperature, intake manifold pressure, engine coolant temperature, pump RPM, and rack position, respectively. Other sensors, collectively denoted 182, monitor other engine operating parameters as may be desired for optimal control of the rack 168 and/or the solenoid valve assemblies 50.

By utilizing as the gaseous fuel injectors solenoid valve assemblies 50 as detailed in Sections 2 and 3 above, the gaseous fuel injection system 154 exhibits improved operational stability on both a valve-to-valve and a cycle-to-cycle basis than similar prior art systems using conventional valve assemblies as injectors. As a result, both short-term and long-term operational stability of the gaseous fuel injection system 154 and, consequently, of the entire engine 150, are enhanced. The durability aspect is especially evident in systems such as the illustrated LNG fueled system because the lack of lubrication of prior non-armature guided valve assemblies led to more rapid degradation of system performance in such fuel injection systems.

Many changes and modifications could be made to the invention without departing from the spirit thereof. For instance, while the solenoid valve assembly has been described primarily in conjunction with a natural gas injection system, it could be used to control the flow of virtually any gaseous fluid or liquid fluid. Moreover, although the guide 62 has been described as being a separate element from the tube 106, it, and possibly the end cap 102, could be formed integrally with the tube 106 to facilitate manufacturing and assembly and to eliminate any potential for leakage around the end cap. In this case, the guide, though "fixedly engaging" the tube within the intended sense of that term as used herein, would be formed from a reduced-diameter section of the tube surrounding at least the upper end of the armature 120. The scope of other changes will become apparent from the appended claims.

I claim:

1. A solenoid valve assembly comprising:
   (A) a valve housing having front and rear opposed axial ends;
   (B) a valve element which is disposed in said valve housing in the vicinity of said front end thereof;
   (C) a tube of essentially constant diameter which is disposed in said valve housing and which extends axially from said rear end of said valve housing towards said front end;
   (D) a coil which surrounds said tube;
   (E) a stationary pole piece which is disposed within said tube and which has a bore formed axially through a central portion thereof;
   (F) a plunger including
      (1) a drive pin which extends through said bore in said pole piece with a radial clearance formed between said drive pin and the wall of said bore, said drive pin having a rear end disposed within said tube and having a front end located axially between said pole piece and said valve element, and
      (2) an armature which is positioned within said tube between said rear end of said tube and said drive pin and which is coupled to said drive pin; and
   (G) a guide bushing which is fixedly mounted in said tube between said rear end of said tube and said pole piece, said guide bushing (1) fixedly engaging said tube, (2) encircling and being slidably engaged by at least a portion of said armature, and (3) guiding said armature for axial motion within said tube upon energization of said coil.

2. A solenoid valve assembly as defined in claim 1, wherein said armature is stepped and has a rear end portion of reduced diameter which is surrounded and guided by said guide bushing and a front end portion of enlarged diameter which is located between said guide and said pole piece, wherein a radial clearance is formed between said front end portion and said tube.

3. A solenoid valve assembly as defined in claim 1, wherein said drive pin is fixedly attached to said armature.

4. A solenoid valve assembly as defined in claim 1, further comprising a plug which plugs said rear end of said tube and which is spaced axially from said guide bushing.

5. A solenoid valve assembly as defined in claim 1, further comprising a second guide bushing which is mounted in said housing axially between said pole piece and said front end of said drive pin, said second guide (1) fixedly engaging said housing, (2) surrounding and being slidably engaged by said drive pin, and (3) guiding said drive pin for axial motion within said tube upon energization of said coil.

6. A solenoid valve assembly as defined in claim 1, wherein an inlet and outlet are formed in said housing in an axially-spaced relationship with respect to one another, and further comprising a valve seat located in said housing between said inlet and said outlet, wherein said valve element is movable under the action of said drive pin (1) from a first position in which it covers said seat to prevent fluid flow from said inlet to said outlet (2) to a second position in which it uncovers said seat to permit fluid flow from said inlet to said outlet.

7. A solenoid valve assembly as defined in claim 6, wherein said valve element comprises a ball.

8. A solenoid valve assembly as defined in claim 1, wherein said valve is configured to control flow of a relatively liquid-free gaseous media therethrough.

9. A solenoid valve assembly as defined in claim 8, wherein said valve is configured to control flow of natural gas therethrough.

10. A solenoid valve assembly comprising:
   (A) a valve housing having front and rear opposed axial ends;
   (B) a valve element which is disposed in said valve housing in the vicinity of said front end thereof;
   (C) a tube of essentially constant diameter which is disposed in said valve housing and which extends axially from said rear end of said valve housing towards said front end;
   (D) a coil which surrounds said tube;
   (E) a stationary pole piece which is disposed within said tube and which has a bore formed axially through a central portion thereof;
   (F) a plunger including
      (1) a drive pin which extends through said bore in said pole piece with a radial clearance formed between said drive pin and the wall of said bore, said drive pin having a rear end disposed within said tube and having a front end located axially between said pole piece and said valve element, and
      (2) an armature which is positioned within said tube between said rear end of said tube and said drive pin and which is coupled to said drive pin; and
   (G) a guide bushing which is positioned within said tube between said rear end of said tube and said pole piece, said guide bushing (1) fixedly engaging said tube, (2) encircling and being slidably engaged by at least a portion of said armature, and (3) guiding said armature for axial motion within said tube upon energization of said coil, said guide bushing being formed from a metal that is impregnated with a lubricant.

11. A solenoid valve assembly comprising:
   (A) a valve housing having front and rear opposed axial ends;
   (B) a valve element which is disposed in said valve housing in the vicinity of said front end thereof;
   (C) a tube of essentially constant diameter which is disposed in said valve housing and which extends axially from said rear end of said valve housing towards said front end;

(D) a coil which surrounds said tube;
(E) a stationary pole piece which is disposed within said tube and which has a bore formed axially through a central portion thereof;
(F) a plunger including
   (1) a drive pin which extends through said bore in said pole piece with a radial clearance formed between said drive pin and the wall of said bore, said clearance extending the entire axial length of said pole piece, said drive pin having a rear end disposed within said tube and having a front end positioned axially between said pole piece and said valve element, and
   (2) an armature which is fixedly attached to said drive pin and which is positioned within said tube between said rear end of said tube and said pole piece, said armature having a rear end portion of relatively small diameter and a front end portion of relatively large diameter which is located between said rear end portion and said pole piece and which is coupled to said drive pin, wherein a radial clearance is formed between said front end portion and said tube;
(G) a first guide bushing which is positioned within said tube between said rear end of said tube and said pole piece, said first guide bushing (1) fixedly engaging said tube, (2) surrounding and being slidably engaged by said rear end portion of said armature, (3) guiding said armature for axial motion within said tube upon energization of said coil and (4) being formed from a metal that is impregnated by a lubricant;
(H) a cap which plugs said rear end of said tube and which is spaced axially from said first guide bushing, said cap having an imperforate axial surface which faces an axial surface of said rear end portion of said armature; and
(I) a second guide bushing which is mounted in said housing axially between said pole piece and said front end of said drive pin, said second guide bushing (1) fixedly engaging said housing, (2) surrounding and being slidably engaged by said drive pin, and (3) guiding said drive pin for axial motion within said tube upon energization of said coil.

12. A solenoid valve assembly as defined in claim 11, wherein an inlet and outlet are formed in said housing in an axially spaced relationship with respect to one another, and further comprising a valve seat located in said housing between said inlet and said outlet, wherein said valve element comprises a ball which is movable under the action of said drive pin (1) from a first position in which it covers said seat to prevent fluid flow from said inlet to said outlet (2) to a second position in which it uncovers said seat to permit fluid flow from said inlet to said outlet.

13. A gaseous fuel injection system for injecting a gaseous fuel into a cylinder of an internal combustion engine, said injection system comprising:
(A) a source of said gaseous fuel; and
(B) a solenoid valve assembly which is supported on said engine and which has a gaseous fuel inlet connected to said source and a gaseous fuel outlet in fluid communication with said cylinder; said solenoid valve assembly including
   (1) a valve housing having front and rear opposed axial ends;
   (2) a valve element which is disposed in said valve housing in the vicinity of said front end thereof;
   (3) a tube of essentially constant diameter which is disposed in said valve housing and which extends axially from said rear end of said valve housing towards said front end;
   (4) a coil which surrounds said tube;
   (5) a stationary pole piece which is disposed within said tube and which has a bore formed axially through a central portion thereof;
   (6) a plunger including
      (a) a drive pin which extends through said bore in said pole piece with a radial clearance formed between said drive pin and the wall of said bore, said drive pin having a rear end disposed within said tube and having a front end located axially between said pole piece and said valve element, and
      (b) an armature which is positioned within said tube between said rear end of said tube and said drive pin and which is coupled to said drive pin; and
   (7) a guide bushing which is fixedly mounted in said tube between said rear end of said tube and said pole piece, said guide bushing (1) fixedly engaging said tube, (2) encircling and being slidably engaged by at least a portion of said armature, and (3) guiding said armature for axial motion within said tube upon energization of said coil.

14. A system as defined in claim 13, wherein said solenoid valve assembly comprises a first solenoid valve assembly, and further comprising
   a gas manifold which is mounted on said engine and in which is mounted said first solenoid valve assembly, and
   a second solenoid valve assembly which is mounted on said gas manifold and which is of identical construction to said first solenoid valve assembly.

15. A system as defined in claim 13, wherein said source comprises a storage tank containing liquified natural gas.

16. A system as defined in claim 13, wherein said armature of said solenoid valve assembly is stepped and has a rear end portion of reduced diameter which is surrounded and guided by said guide and a front end portion of enlarged diameter which is located between said guide and said pole piece, wherein a radial clearance is formed between said front end portion and said tube.

17. A system as defined in claim 13, wherein said solenoid valve assembly further comprises a plug which plugs said rear end of said tube and which is spaced axially from said guide.

18. A system as defined in claim 13, wherein said guide busing is formed from a metal that is impregnated by a lubricant.

* * * * *

UNITED STATES PATENT AND TRADEMARK OFFICE
CERTIFICATE OF CORRECTION

PATENT NO. : 5,752,689
DATED : May 19, 1998
INVENTORS : Barkhimer et al.

It is certified that error appears in the above-identified patent and that said Letters Patent is hereby corrected as shown below:

Col. 9, line 60, after "guide" insert --bushing--.

Signed and Sealed this

Twenty-ninth Day of May, 2001

Attest:

NICHOLAS P. GODICI

*Attesting Officer*    Acting Director of the United States Patent and Trademark Office